No. 626,893. Patented June 13, 1899.
W. FIDDES.
GAS METER.
(Application filed Dec. 21, 1897.)
(No Model.) 4 Sheets—Sheet 1.
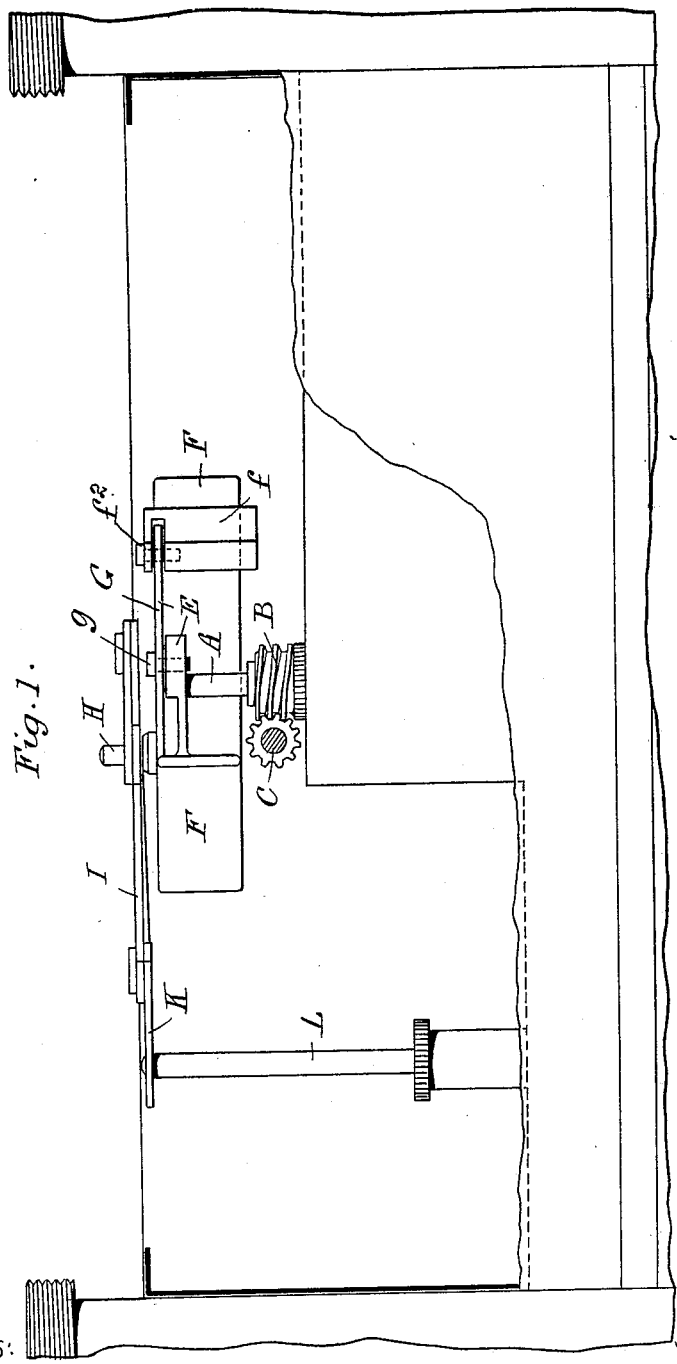
Witnesses:
P. W. Wright.
S. C. Connor.
Inventor
William Fiddes
By Howson and Howson
His Attorneys.

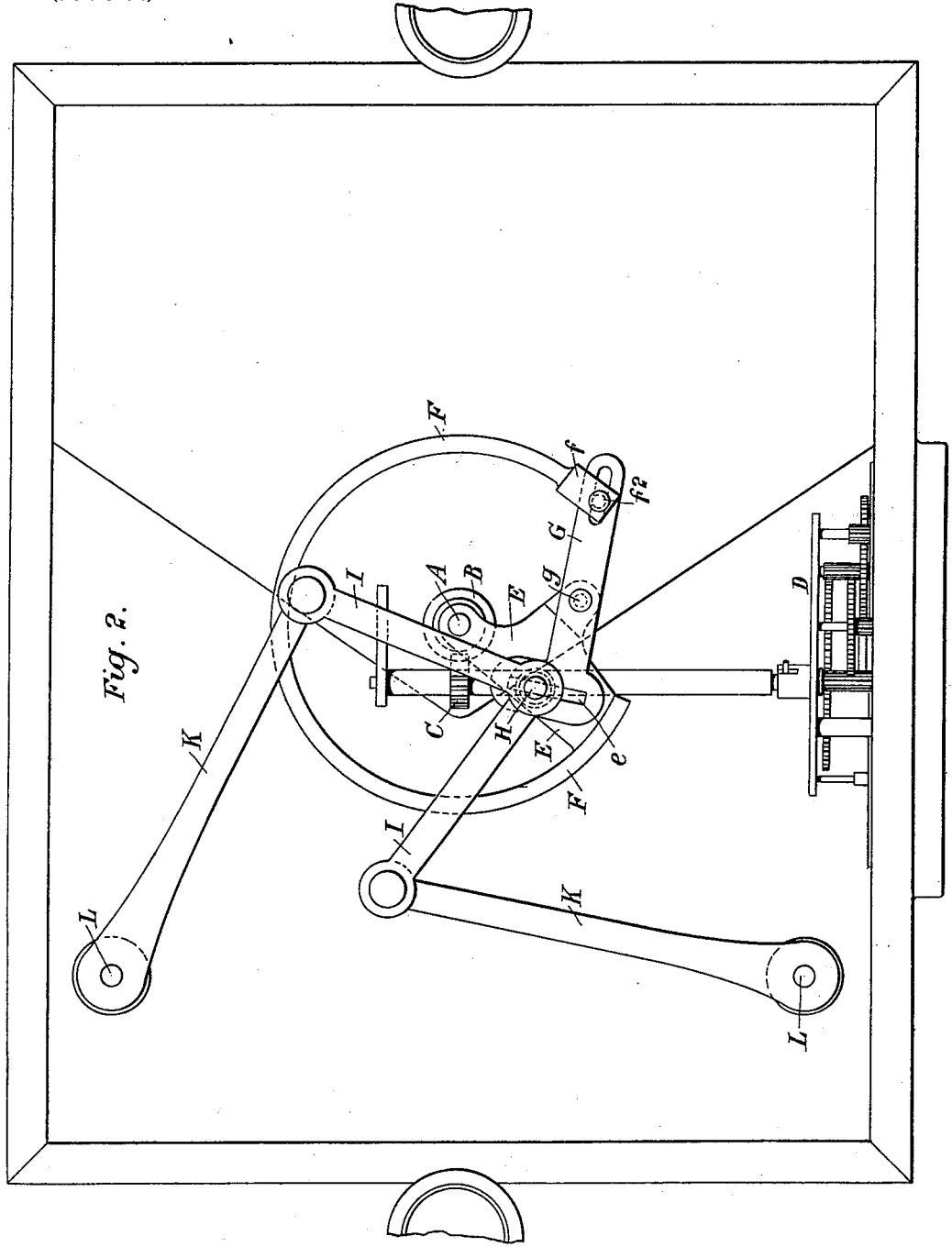

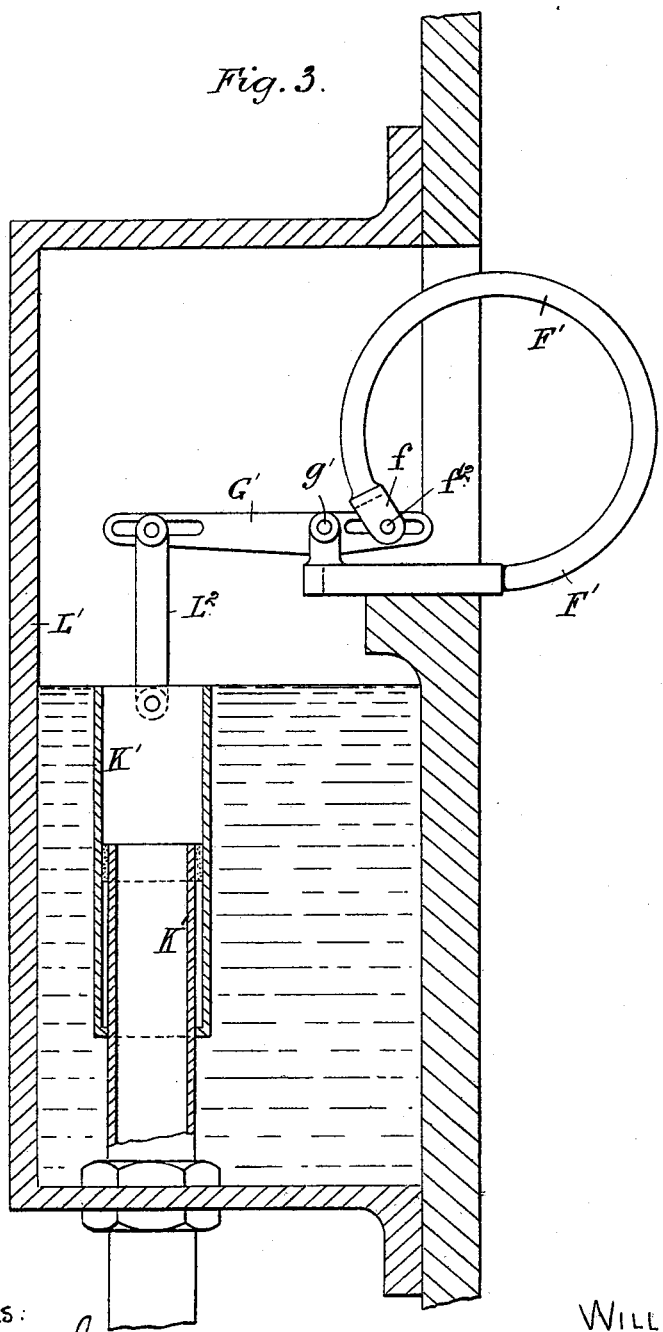

No. 626,893. Patented June 13, 1899.
W. FIDDES.
GAS METER.
(Application filed Dec. 21, 1897.)
(No Model.) 4 Sheets—Sheet 4.
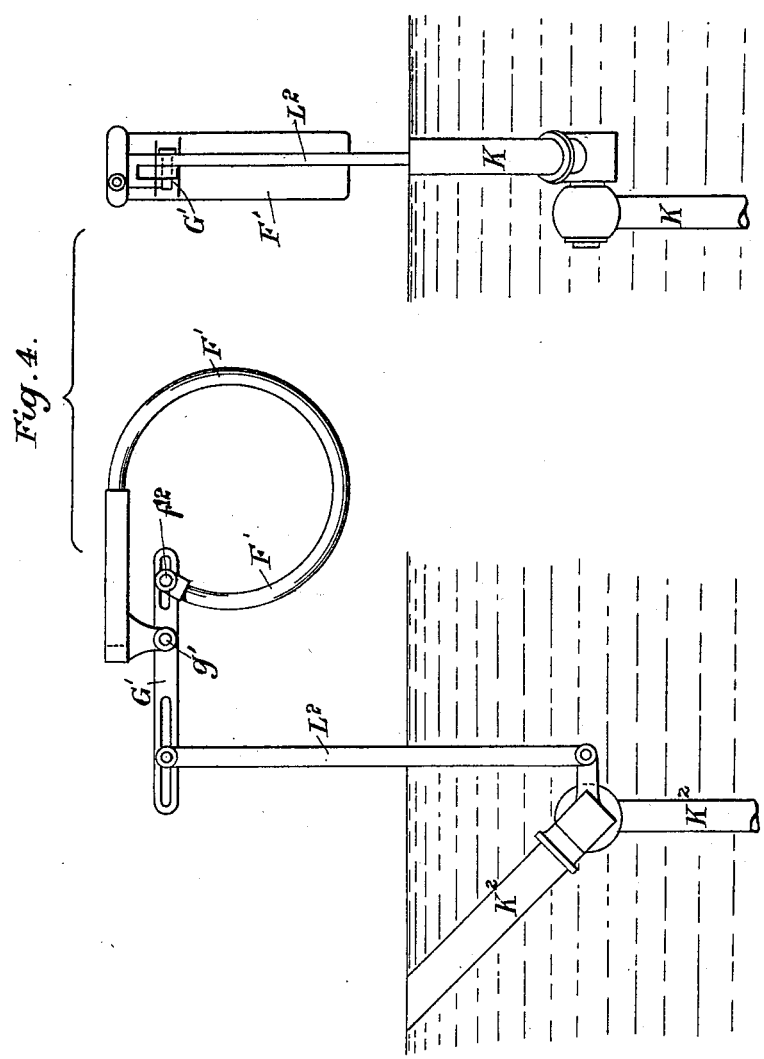
WITNESSES:
F. W. Wright.
S. C. Connor
INVENTOR
WILLIAM FIDDES
BY Howson and Howson
HIS ATTORNEYS.

UNITED STATES PATENT OFFICE.

WILLIAM FIDDES, OF BRISTOL, ENGLAND, ASSIGNOR OF ONE-HALF TO THE W. & B. COWAN, LIMITED, OF LONDON, ENGLAND.

GAS-METER.

SPECIFICATION forming part of Letters Patent No. 626,893, dated June 13, 1899.

Application filed December 21, 1897. Serial No. 662,823. (No model.)

*To all whom it may concern:*

Be it known that I, WILLIAM FIDDES, gas engineer, a subject of the Queen of Great Britain and Ireland, residing at the Gas Works, Bristol, in the county of Gloucester, England, have invented certain Improvements in Gas-Meters, (for which I have, in conjunction with the W. & B. Cowan, Limited, of Smith Square Works, in the city of Westminster, London, England, obtained patents in Great Britain, No. 7,358, dated April 10, 1895; in France, No. 255,486, dated April 11, 1896; in Denmark, No. 1,182, dated July 27, 1897; in Victoria, No. 13,537, dated September 25, 1896; in New South Wales, No. 6,931, dated September 28, 1896, and in Canada, No. 55,685, dated April 22, 1897,) of which the following is a specification.

The object of this invention is to provide, in combination with gas-meters, means whereby arrangements through which the consumption of gas is indicated are automatically adjusted in accordance with the temperature, so that the quantity of gas registered by the meter shall be the volume which the gas occupies at a given temperature, say 60° Fahrenheit. In meters as hitherto arranged as the gas expands or contracts in bulk owing to changes in temperature at the place where the meters are situated the registration of the meter has not truthfully indicated the standard volume of gas at a given temperature which has passed through the meter. In hot weather, for example, the volume indicated is too large and in cold weather it is too small in relation to the standard volume at a given temperature.

According to this invention the effect of temperature in altering the bulk or form of gases, liquids, or solids is employed, so that as the temperature varies the amount of gas which the meter passes at each operation is automatically varied, the meter passing a less volume at low temperatures and a larger volume at high temperatures.

The invention may be practically applied in various ways. For example, in a dry gas-meter there may be employed with the mechanism by which the movements of the bellows are conveyed to the registering device or counter a connection or attachment of the part which is caused to vary in bulk or form under variations of temperature, which will vary the amount of movement of the part or parts which measures or measure the volume of gas passing. In a wet meter, such as a station-meter, where liquid is constantly supplied to the meter, the part which is caused to vary in bulk or form under variations of temperature may operate a device which will lower the level of liquid and cause it to rise according to the variations of temperature.

In order that my invention may be fully understood, I shall now proceed more particularly to describe the same, and for that purpose shall refer to the several figures on the annexed sheets of drawings, the same letters of reference indicating corresponding parts in all the figures.

Figure 1 shows in sectional elevation the upper portion of a dry gas-meter provided with an arrangement according to this invention, and Fig. 2 is a plan of the same. Fig. 3 shows an arrangement according to this invention applied to a station wet meter, and Fig. 4 is a modification thereof.

Referring to Figs. 1 and 2, A is the cranked shaft or spindle, which receives rotary motion by the pulsations of the bellows of the meter, and the said crank operating the valves and also, through the worm B and worm-wheel C, operating the counter D in the usual manner. Fast on the shaft or spindle A is an arm E, to which is rigidly connected one end of a curved rod or tube F, of any suitable material which will readily expand and contract by variations of temperature. This rod or tube is preferably hollow for containing a fluid under pressure. The end $f$ of this curved rod or tube is connected by pin-and-slot connection at $f^2$ to one end of a lever G, which is centered at $g$ to the arm E, the opposite end of the said lever being provided with a slot $e$, in which is adjustably fixed a stud H. To the stud H are connected by the links I the arms K, fast on rods L, which are caused by the pulsations of the bellows to rock in their bearings and impart, through the arms and links hereinbefore described, rotation to the shaft or spindle A. The volume of gas admitted to the interior of bellows to effect the pulsations thereof will depend upon the position of the stud H with relation to the axis of the spindle A. The farther the movement of the lever G carries the said stud away from the axis of the spindle A the greater will be the extent of expansion and contraction of the bellows, and consequently will pass a greater volume of gas to effect the rotation of the shaft A, while the nearer the stud is moved toward the shaft or spindle A the less will be the expansion and contraction of the bellows, and consequently a less volume of gas will pass at each rotation of the shaft or spindle A. The position of the stud H is automatically adjusted nearer to or farther from the shaft or spindle A by the contraction and expansion of the curved rod or tube F. Consequently when the temperature is below a certain medium and the gas is below a certain density the rod or tube F will be contracted and will move the stud H nearer to the shaft or spindle A, and thereby restrict the movement of the bellows and admit a less volume of gas at each rotation of the counter mechanism, and when the temperature is above the medium and the gas is correspondingly dilated the rod or tube F will expand and move the stud H farther from the shaft or spindle A and permit of the expansion and contraction of the bellows to a greater extent and so admit of an increased volume of gas passing for each rotation of the counter mechanism. Consequently, whatever the temperature may be, the gas passing through the meter will at all times register on the counter a uniform supply at a certain medium density.

In applying my invention to wet gas-meters such as are used as station-meters, as shown in Fig. 3, the expanding and contracting rod or tube F' carries at one end the fulcrum $g'$ of a lever G', one arm of which is connected by a pin-and-slot connection $f^{12}$ to the other end of the rod or tube F', the other arm of the said lever being similarly connected by a link $L^2$ to the sliding portion of the outlet-tube K' for water, which tube is made telescopic in the chamber L', to which water (or other liquid) is constantly supplied, the level of the liquid in the chamber being determined by the height of the said telescopic tube, through which any excess of liquid admitted to the chamber will overflow. This chamber L' is in communication with the chamber containing the drum or gas-measuring device, and to prevent the escape of gas by the tube K' it is provided with a siphon bend, so as to form a seal. The level of the liquid in the chamber L' and in the chamber containing the measuring drum or device determines the volume of gas allowed to pass through the meter, and according to this invention the level of the liquid is automatically regulated by variations in the temperature due to the action of temperature, as aforesaid, on the rod or tube F'. When the temperature increases above a certain medium and the gas is consequently dilated, the rod or tube F' expands and turns the lever G' on its fulcrum, so as to lower the sliding portion of the telescopic tube K' to below the normal level of the liquid and cause the liquid to overflow through the said tube and so increase the space in the measuring-chamber of the meter to allow an increased volume of gas to pass through. In like manner when the temperature decreases below the normal the rod or tube F' contracts and acts on the lever G' to raise the movable part of the tube K', so that the liquid (which, as before described, flows into the chamber) will be raised above the normal level and so decrease the space in the measuring-chamber for the passage of gas. Instead of the telescopic overflow-tube last described a hinged or articulated overflow-pipe $K^2$ may be employed, as shown in Fig. 4. This will be clearly understood without further description, the same letters of reference being employed to indicate parts corresponding to the parts shown in Fig. 3. I prefer to employ for the expanding and contracting device F a tube charged with alcohol under pressure to render it very sensitive to changes of temperature.

I claim—

1. In a dry gas-meter, the combination of a registering mechanism and a shaft or spindle actuating the same, with measuring-bellows mechanism to operate said spindle and a curved expansion rod or tube between the spindle and bellows mechanism to vary the action according to the temperature, substantially as described.

2. In gas-meters, the combination of a registering device and a measuring device, with a curved expansion rod or tube controlling the latter and acted upon by changes of temperature to automatically alter the amount of movement of the measuring device relatively to the movement of the registering device, substantially as hereinbefore described.

In testimony whereof I have signed my name to this specification in the presence of two subscribing witnesses.

WILLIAM FIDDES.

Witnesses:
E. MORGAN REES,
JAMES SMITH.